(12) United States Patent
Waltz et al.

(10) Patent No.: US 8,454,037 B2
(45) Date of Patent: Jun. 4, 2013

(54) OUTRIGGER ASSEMBLY WITH QUICK CHANGE LOAD WHEEL ASSEMBLY

(75) Inventors: Lucas B. Waltz, Coldwater, OH (US); Ryan M. Snodgrass, New Bremen, OH (US); Kevin A. Gilliland, Coldwater, OH (US); Eric P. Gasser, Findlay, OH (US); Keith G. Bornhorst, New Bremen, OH (US); Kurt A. Hilgefort, Minster, OH (US)

(73) Assignee: Crown Equipment Corporation, New Bremen, OH (US)

( * ) Notice: Subject to any disclaimer, the term of this patent is extended or adjusted under 35 U.S.C. 154(b) by 434 days.

(21) Appl. No.: 12/869,092

(22) Filed: Aug. 26, 2010

(65) Prior Publication Data
US 2010/0320034 A1 Dec. 23, 2010

Related U.S. Application Data

(63) Continuation-in-part of application No. 11/763,487, filed on Jun. 15, 2007, now Pat. No. 7,845,657.

(51) Int. Cl.
*B66F 9/06* (2006.01)
(52) U.S. Cl.
USPC ......... 280/81.1; 280/82; 280/43.12; 280/755; 187/232; 187/222; 16/47; 16/29; 16/30; 301/5.1; 301/36.1; 301/125
(58) Field of Classification Search
USPC ... 187/232, 222; 301/5.1, 36.1, 125; 305/132, 305/134; 280/81.1, 82, 767, 43.12, 755.676, 280/47.26, 47.27; 16/47, 29, 30
See application file for complete search history.

(56) References Cited

U.S. PATENT DOCUMENTS

| 1,799,307 | A | 4/1931 | Manley |
| 2,925,887 | A | 2/1960 | Gibson |
| 3,246,713 | A | 4/1966 | Nichols |
| 3,260,534 | A | 7/1966 | Knights |
| 3,265,158 | A | 8/1966 | Constable |
| 3,638,961 | A | 2/1972 | Larsen |
| 3,778,080 | A | 12/1973 | Bilco |
| 3,876,039 | A | 4/1975 | Bushnell, Jr. |
| 3,950,811 | A | 4/1976 | Larson |
| 4,086,680 | A | 5/1978 | Kelly |
| 4,576,391 | A | 3/1986 | Gerstner |

(Continued)

FOREIGN PATENT DOCUMENTS

| CA | 911937 | 10/1972 |
| JP | 2000007294 A | 1/2000 |
| JP | 2002067963 A | 3/2002 |
| JP | 2006056647 A | 3/2006 |

OTHER PUBLICATIONS

Crown Specification Brochure No. SF 14502 entitled Crown SP 3400 Series Stockpicker; Apr. 2005; 6 pages; U.S.A.

(Continued)

*Primary Examiner* — Ruth Ilan
(74) *Attorney, Agent, or Firm* — Stevens & Showalter LLP (57) ABSTRACT

A load wheel assembly for a materials handling vehicle includes first and second spaced side members, at least one rotatable roller extending between the first and second side members. An interface structure provides a substantially rigid connection between the load wheel assembly and a mounting structure on the materials handling vehicle. The mounting structure includes a transverse bar and the interface structure includes a portion that engages and mates with the transverse bar to form a rigid connection between the interface structure and the transverse bar.

13 Claims, 12 Drawing Sheets

U.S. PATENT DOCUMENTS

| | | |
|---|---|---|
| 4,669,146 A | 6/1987 | Saito et al. |
| 4,813,512 A | 3/1989 | McCormick |
| 5,136,751 A | 8/1992 | Coyne et al. |
| 5,339,773 A | 8/1994 | Van Druff |
| 5,417,536 A | 5/1995 | Cech |
| 5,560,129 A | 10/1996 | Rothbart |
| 5,584,363 A | 12/1996 | Curtin et al. |
| 5,586,620 A | 12/1996 | Dammeyer et al. |
| 5,752,584 A | 5/1998 | Magoto et al. |
| 5,940,932 A | 8/1999 | LaHay |
| 6,137,398 A | 10/2000 | Dunlap et al. |
| 6,138,796 A | 10/2000 | Herschel |
| 6,199,665 B1 | 3/2001 | Eilerman et al. |
| 6,789,994 B2 | 9/2004 | Tortellier |
| D499,853 S | 12/2004 | Ryan et al. |
| D505,763 S | 5/2005 | Greene |
| 6,904,641 B2 | 6/2005 | Magoto et al. |
| 7,162,772 B2 | 1/2007 | Asher |
| 2005/0034929 A1 | 2/2005 | West et al. |
| 2006/0232030 A1 | 10/2006 | Passeri |
| 2008/0308359 A1 | 12/2008 | Waltz et al. |

OTHER PUBLICATIONS

Crown Specification Brochure No. SF 12896 entitled Crown RR 5200 Series S Class Narrow-Aisle Reach Truck; Jun. 2005; 6 pages; U.S.A.

Blumenberg, Claus; International Search Report and Written Opinion of the International Searching Authority; International Application No. PCT/US2011/049265; Dec. 16, 2011; European Patent Office.

OUTRIGGER ASSEMBLY WITH QUICK CHANGE LOAD WHEEL ASSEMBLY

CROSS-REFERENCE TO RELATED APPLICATION

This application is A CONTINUATION-IN-PART APPLICATION of and claims priority to U.S. patent application Ser. No. 11/763,487, filed on Jun. 15, 2007, now U.S. Pat. No. 7,845,657 entitled "QUICK CHANGE LOAD WHEEL ASSEMBLY," the entire disclosure of which is incorporated by reference herein.

FIELD OF THE INVENTION

The present invention relates generally to materials handling vehicles such as forklift trucks and, more particularly, to a quick change load wheel assembly that may be quickly mounted on and removed from a straddle arm or an outrigger on a materials handling vehicle.

BACKGROUND OF THE INVENTION

Forklift trucks, such as rider reach and stock picker trucks, are typically provided with a pair of forwardly extending straddle arms mounted outside of vertically movable forks of the trucks where they do not impede lowering of the forks to the floor, and do not interfere with any load supported upon the forks. The straddle arms each carry one or more load wheels to support the weight of the truck and any load carried by the forks. After use over a period of time, the load wheels normally experience wear or may become damaged and require replacement.

A known construction for a base leg assembly for a straddle arm including load wheels for a lift truck is illustrated in U.S. Design Pat. Nos. D505,763 and D499,853 and also in U.S. Patent Application Publication No. 2005/0034929 A1. The base leg assembly has a mounting plate, a base leg and a load wheel assembly. The base leg has an integrally cast mounting portion and a leg portion that extends laterally from the mounting portion and transitions in direction approximately 90° such that the leg portion extends forward of the mounting portion and the lift truck at its distal end. A load wheel assembly includes a pair of load wheel plates which are mirror images of each other and have inner surfaces that engage the outer surface of the distal end of the leg portion of the base leg. The load wheel plates are fastened to the base leg using threaded fasteners. An elongated aperture extends transversely through each load wheel plate and receives load wheels. The elongated apertures are shaped such that they can receive different numbers, sizes, and types of load wheels which are disposed between the load wheel plates and supported such that they can rotate.

In order to remove the load wheel assembly from the straddle arm, the fasteners securing the load wheel plates to the leg portion of the base leg are removed to release the wheel plates. For reassembly, load wheels of a required size and type are disposed between the load wheel plates which are then moved into position so that the plates can be resecured to the leg portion of the base leg by the fasteners that were previously removed. Since this type of repair is typically performed in the field, it can be difficult and require care in manipulating the load wheels and load wheel plates for reinstallation.

In another configuration for mounting load wheels to a straddle arm, a mounting structure comprising a weldment having spaced bearing plates is located at the end of the straddle arm. Pivot plates located in apertures in each of the bearing plates support wheel axles for two spaced wheels. In order to replace the wheels, the axles must be removed, resulting in release of the wheels as well as various washers and bearings supported on the wheels and axles. A repair operation performed in the field can be difficult in that the procedure for assembling replacement wheels into the bearing plate requires manipulating various parts onto the axles as the axles are moved into position in the pivot plates. Such a repair operation can be further complicated by the location of the of load wheel structure adjacent the floor surface limiting access to the parts positioned between the bearing plates.

SUMMARY OF THE INVENTION

In accordance with one aspect of the present invention, an outrigger assembly for a materials handling vehicle is provided comprising a frame supporting a straddle arm and an outrigger box coupled to the straddle arm. The outrigger box may comprise a pair of bearing plates laterally spaced from each other and defining a load wheel opening therebetween, and a transverse bar spanning across the load wheel opening between the bearing plates. A load wheel assembly may be provided comprising first and second side support members spaced laterally from one another, at least one roller mounted for rotation between the first and second side support members to define at least one load wheel, an axle supporting the at least one roller to the first and second side support members, and an interface structure spanning between and coupled to the first and second side support members. The interface structure may have at least a portion that engages and mates with the transverse bar to provide a substantially rigid connection between the interface structure and the transverse bar and thereby to the materials handling vehicle.

In accordance with another aspect of the invention, a materials handling vehicle is provided having a quick change load wheel assembly and comprising a frame, a mast assembly coupled to the frame, and a pair of straddle arms coupled to the frame and extending from a front of the vehicle. Each of the straddle arms may include a mounting structure comprising a pair of laterally spaced bearing plates defining a load wheel opening for receiving a quick change load wheel assembly, and a transverse bar extending laterally across the load wheel opening. The load wheel assembly may comprise first and second side support members spaced laterally from one another, a pair of rollers mounted for rotation between the first and second side support members to define a pair of load wheels, an axle supporting each of the rollers to the first and second side support members, and a block member spanning between and coupled to the first and second side support members. The side support members may be supported for pivotal movement relative to the block member. The block member has at least a portion that engages and mates with the transverse bar to provide a substantially rigid connection between the block member and the transverse bar and thereby to the materials handling vehicle.

In accordance with yet another aspect of the invention, a method is provided of installing a load wheel assembly on an outrigger for a materials handling vehicle. The outrigger may comprise an outrigger box comprising a pair of laterally spaced bearing plates defining a load wheel opening for receiving a load wheel assembly, and a transverse bar extending laterally across the load wheel opening. The load wheel assembly may comprise at least one roller supported on an axle between a pair of side support members and an interface structure extending between the pair of side support members. The method comprises: positioning the load wheel assembly in the load wheel opening with the interface structure located above the transverse bar, engaging at least one threaded fastener between the interface structure and the transverse bar, and rotating the fastener to draw the transverse bar toward engagement with the interface structure.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
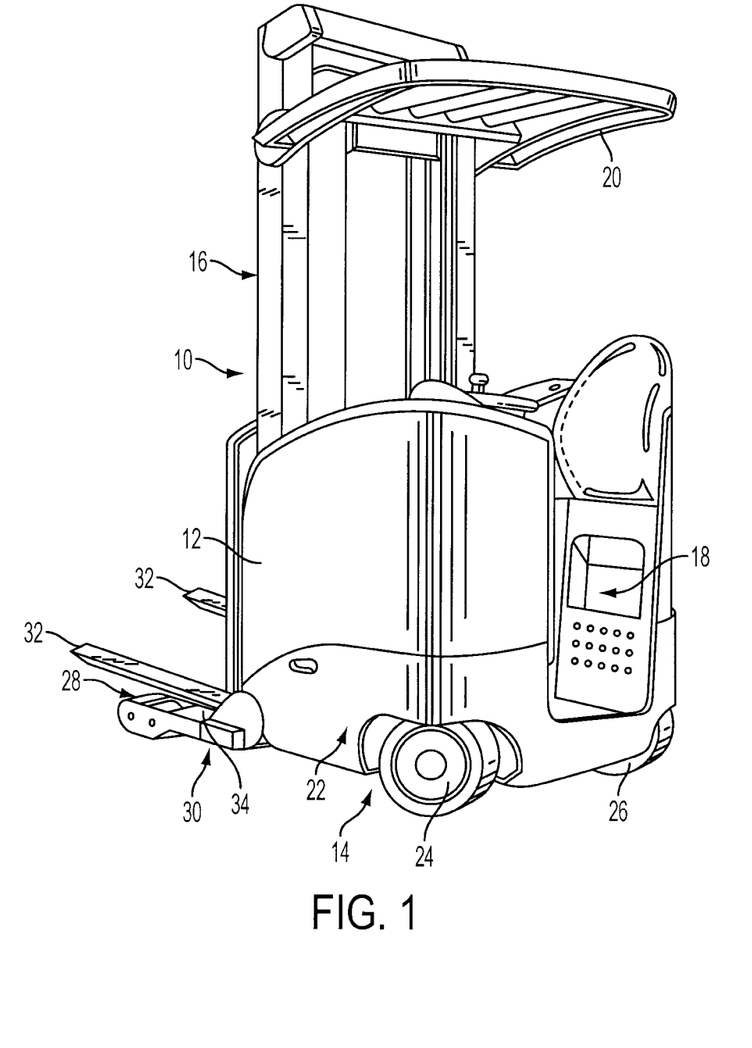
FIG. 1 is a perspective view of a typical forklift truck incorporating the present invention.

Reference is now made to FIG. 1 which shows a materials handling vehicle incorporating the present invention. The vehicle comprises, in the illustrated embodiment, a rider reach forklift truck 10. The truck 10 includes a frame 12, a drive mechanism 14 supported on the frame 12, a mast assembly 16 coupled to the frame 12, an operator's compartment 18 and an overhead guard 20. The drive mechanism 14 includes a power unit 22 which houses a battery (not shown) for supplying power to a traction motor (not shown) connected to a steerable, powered wheel 24 and to hydraulic motors (not shown) which supply power to several different systems.

The truck is supported at four points which are provided by the steerable, powered wheel 24 located at the left rear of the power unit 22, a caster wheel 26 located at the right rear of the power unit 22, and two load wheel assemblies 28 supported on a pair of outrigger assemblies or straddle arms 30 (only one of which, the left straddle arm, is shown in FIG. 1) extending from the power unit 22 at the front of the truck 10. The straddle arms 30 are attached to the power unit 22 so that they extend outwardly beyond the sides of the mast assembly 16 to allow a pair of forks 32 to be lowered to the floor between the straddle arms 30 without interference, and so that the straddle arms 30 do not interfere with any load supported on the forks.

Figure 2:
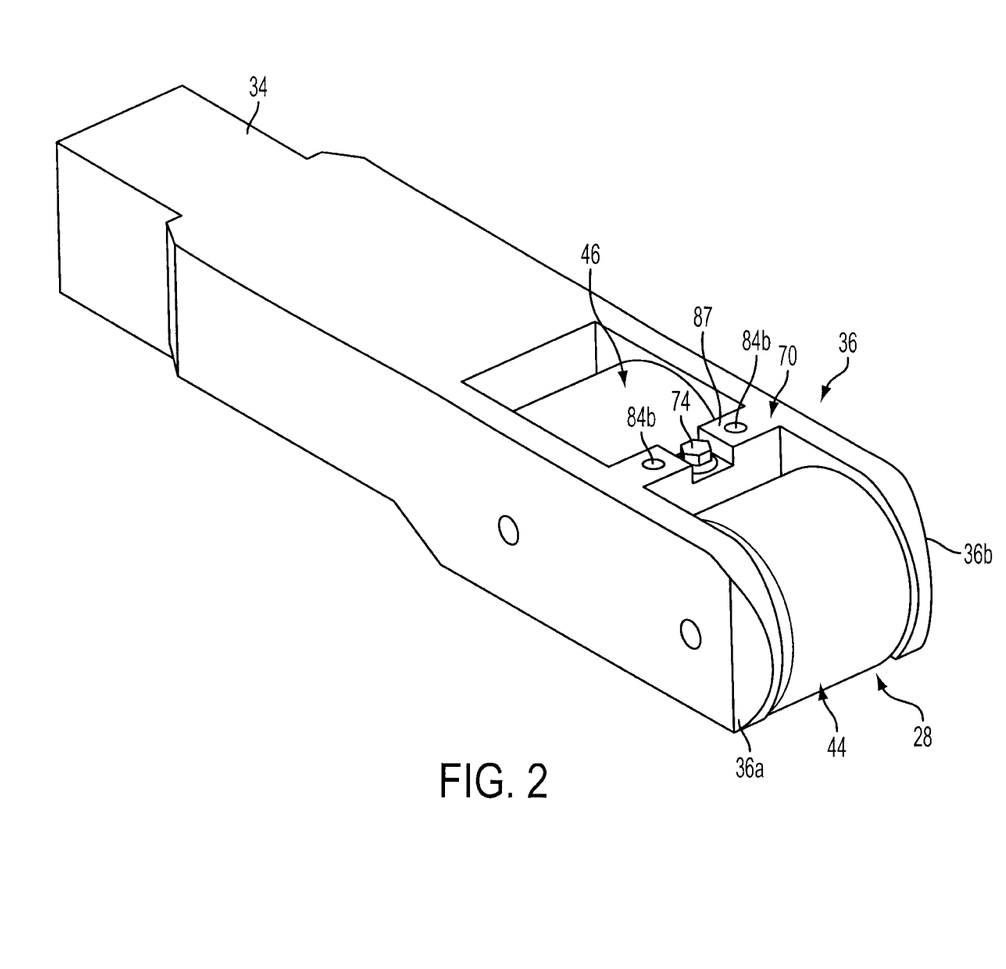
FIG. 2 is a perspective view of the end of a straddle arm of the forklift truck of FIG. 1.

Referring additionally to FIG. 2, each straddle arm 30 comprises a forwardly extending solid steel bar or arm member 34. A load bearing structure 36 comprising a pair of bearing plates 36a, 36b is located at the forward end of the arm member 34 with the load wheel assembly 28 supported between the pair of bearing plates 36a, 36b. The bearing plates 36a, 36b are illustrated as being a solid extension of the arm member 34 for example by having the bearing plates 36a, 36b and arm member 34 comprise a weldment or by being cast as a single integral unit. However, it should be understood that the present invention is not limited to a particular structure for providing the bearing plates 36a, 36b at the end of the arm member 34. The bearing plates 36a, 36b may comprise, for example, separate plate members that are attached to the end of the arm member 34, such as by bolting individual bearing plates 36a, 36b to the arm member 34. In any event, the assembly and disassembly operations described for the load wheel assemblies 28 do not require removal or reattachment of the bearing plates 36a, 36b from or to the arm member 34.

Figure 3:
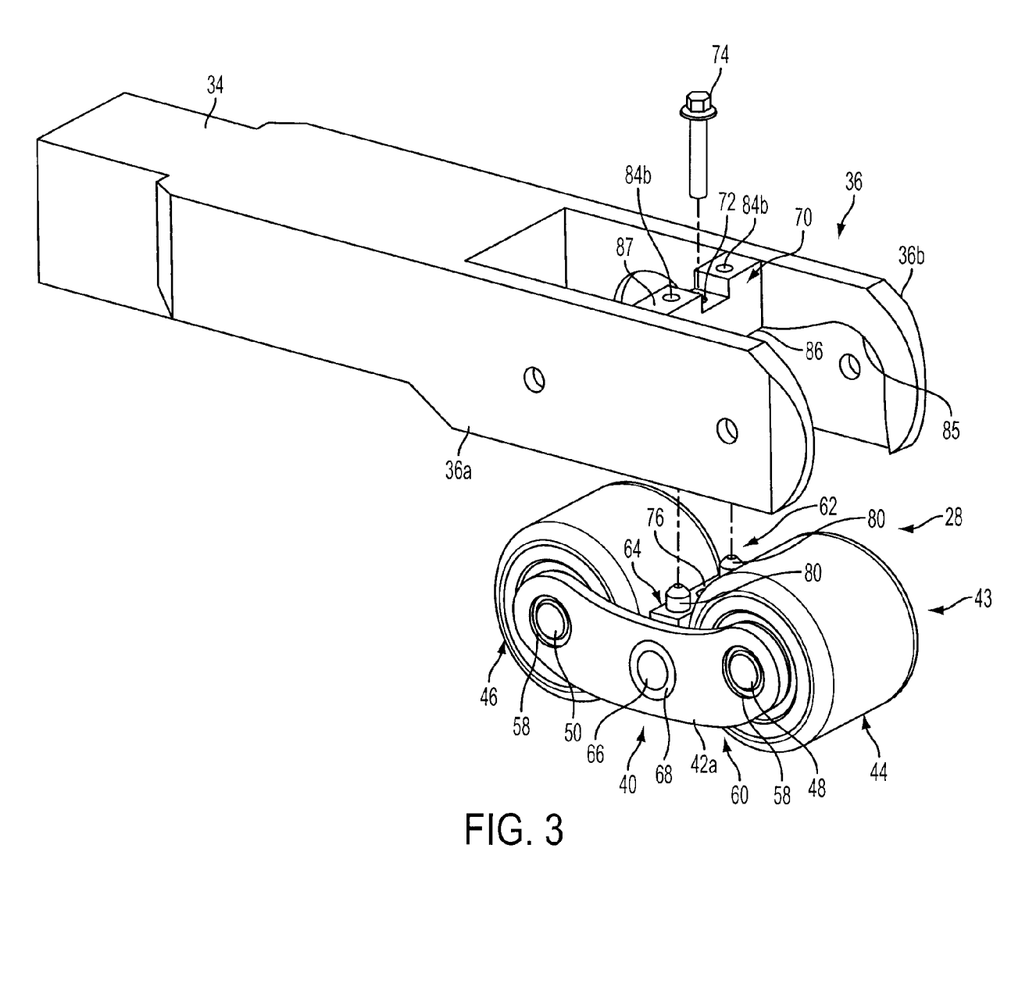
FIG. 3 is a view similar to FIG. 2 with a load wheel assembly disassembled from the straddle arm.
Figure 4:
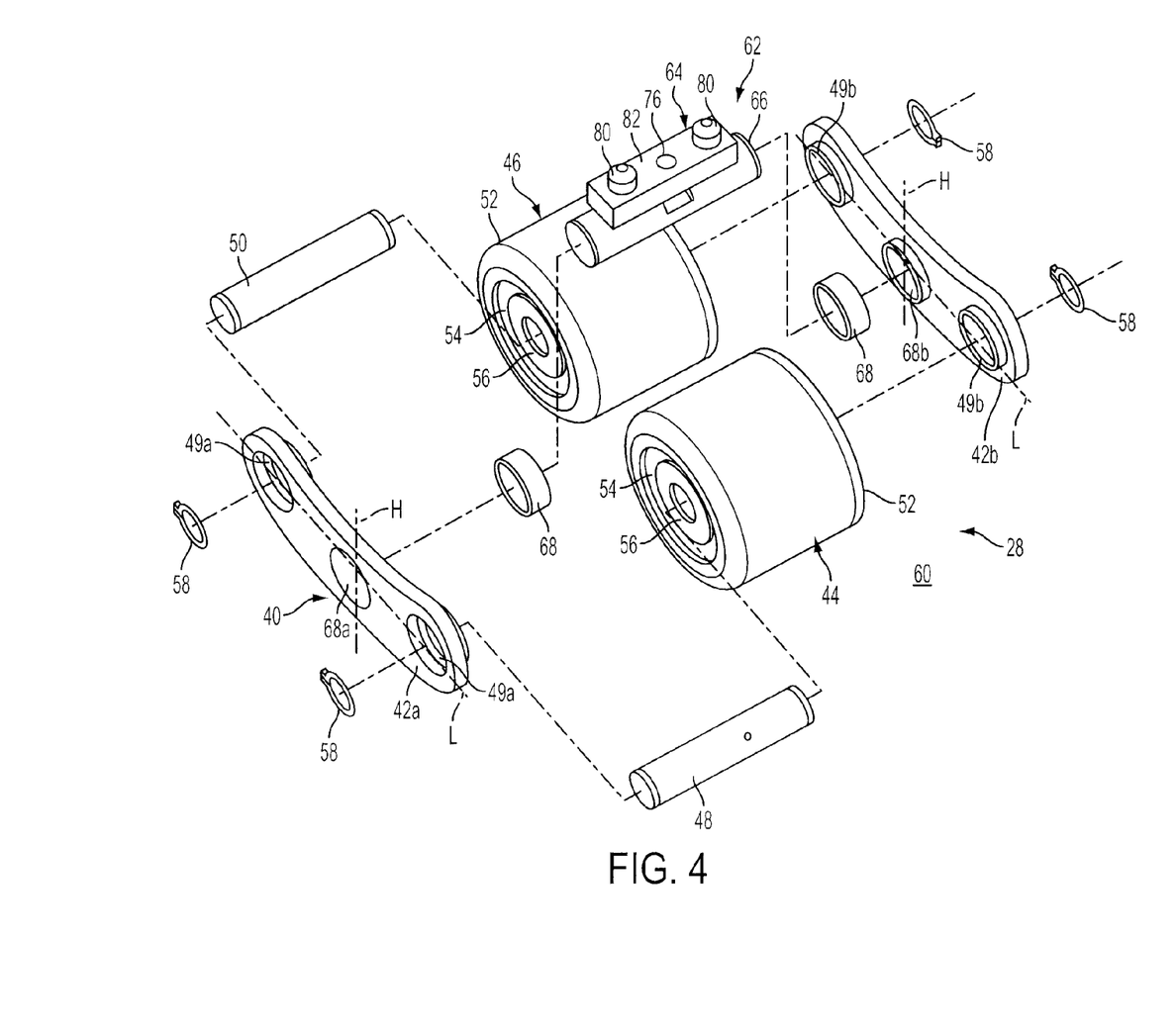
FIG. 4 is an exploded perspective view of the load wheel assembly.

Referring to FIGS. 3 and 4, the illustrated load wheel assembly 28 includes a first side member 42a and a second side member 42b located in laterally spaced relation to the first side member 42a. The side members 42a, 42b are elongated having a major longitudinal axis L and a minor height axis H. First and second rollers or wheels 44, 46 are supported for rotation on respective first and second axles 48, 50 to define a roller structure 43. The first and second axles 48, 50 extend transversely between the side members 42a, 42b with the ends of the axles 48, 50 being received within openings 49a, 49b in the respective side members 42a, 42b. Each of the wheels 44, 46 may comprise known load wheels including a tire 52 supported on a hub portion 54 which includes a bearing 56 for engaging with a respective axle 48, 50. It should be noted that the roller structure 43 may comprise structure other than that specifically described herein, and the roller structure 43 may comprise any load carrying assembly that provides a floor engaging component for reducing resistance between the straddle arm 30 and the floor as the truck 10 is maneuvered across the floor. Further, while two wheels 44, 46 are shown in the illustrated embodiment, the roller structure can have a single wheel or more than two wheels as required for a given application.

The roller structure 43 is maintained in the side members 42a, 42b by a retainer illustrated as comprising a type of snap ring 58 known as circlips snapped into annular slots at the ends of the axles 48, 50. Alternately, retention structure can comprise other fastening devices associated with the axles 48, 50 or the side members 42*a*, 42*b* as will be apparent to those skilled in the art. The retention structure can even simply be tape secured to cover the openings 49*a*, 49*b* in the respective side members 42*a*, 42*b* or wrapped around the roller structure 43 and the side members 42*a*, 42*b* prior to installation. Whatever retainer or retention structure is used, the assembly comprising the roller structure 43 and the retained side members 42*a*, 42*b* define an assembled roller unit 60 for the load wheel assembly 28.

The load wheel assembly 28 further includes an interface structure 62 for providing a substantially rigid connection between the load bearing structure 36 and the assembled roller unit 60. In the illustrated embodiment, the interface structure 62 comprises a block member 64 rigidly attached to a pivot pin 66. The block member 64 may be attached to the pivot pin 66 by any conventional method, for example by welding, or the block member 64 and pivot pin 66 may be formed as a unitary member. The pivot pin 66 extends transversely to the longitudinal axis L and the height axis H, and is mounted for rotation to the frame structure 40 at pivot apertures 68*a*, 68*b* formed in the respective side members 42*a*, 42*b*, generally centrally of the side members 42*a*, 42*b*, i.e., between the first and second wheels 44, 46 as illustrated. The ends of the pivot pin 66 are engaged with bearing members 68 located within the pivot apertures 68*a*, 68*b*. The pivot pin 66 forms a pivot structure about which the assembled roller unit 60 may pivot.

Figure 3A:
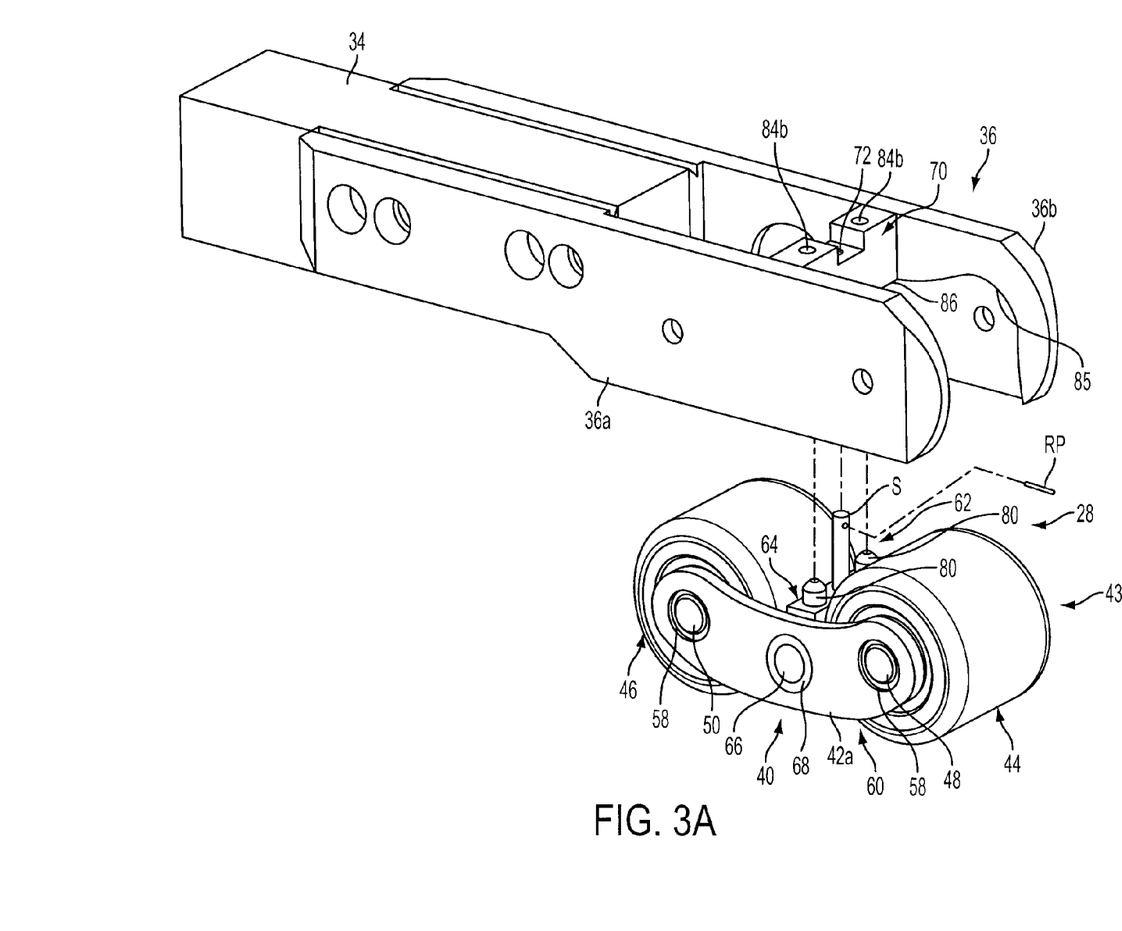
FIGS. 3a and 3b are views similar to FIG. 3 but illustrating removable bearing plates and an alternate fastener and interface structure.

Referring to FIGS. 2 and 3, the load bearing structure 36 includes a mounting structure comprising a transverse bar 70 extending between and rigidly attached to the bearing plates 36*a*, 36*b*. The bearing plates 36*a*, 36*b* and bar 70 can be connected to one another by welding or alternately could be formed as a single casting or part. The bar 70 includes an aperture 72 through which a threaded fastener 74 of the interface structure 62 may extend to engage a threaded aperture 76 defined through an upper surface 82 of the block member 64. Thus, as illustrated in FIGS. 2-4, a single, downwardly inserted bolt secures the wheel assembly 28 to the load bearing structure 36. It is noted that a bolt could be inserted upwardly with the aperture 72 being threaded to receive the bolt and other fasteners can be used to secure the wheel assembly to the load bearing structure 36. For example, a stud S can be formed on either the wheel assembly 28 or the bar 70 to be received in a receiving aperture in the other structure with the stud S being secured by means of a roll pin RP or otherwise, see FIG. 3*a*. FIG. 3*a* also illustrates individual bearing plates 36*a*, 36*b* which can be bolted to the arm member 34.

Figure 5:
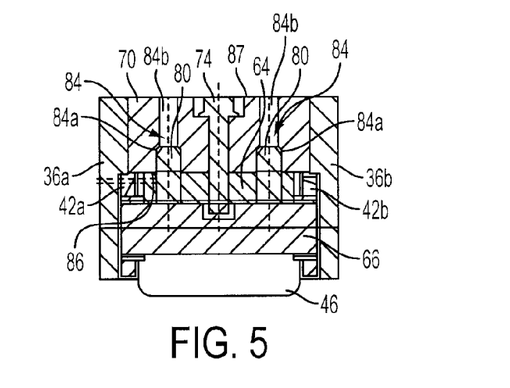
FIG. 5 is an enlarged cross-sectional view taken along line 5-5 in FIG. 6.

Referring to FIG. 5, the bar 70 includes a pair of holes 84, where each hole 84 comprises a lower hole portion 84*a* extending upwardly from a lower surface 86 of the bar 70, and a smaller diameter upper hole portion 84*b* extending upwardly from the lower hole portion 84*a* to an upper surface 87 of the bar 70. The block member 64 includes a pair of pins 80 extending upwardly from its upper surface 82 for engaging within the lower hole portions 84*a* of the bar 70. Each of the bearing plates 36*a*, 36*b* additionally includes a downwardly facing cutout area 85 (only one shown in FIG. 3) for receiving correspondingly structured upper surfaces of the side members 42*a*, 42*b*, and the bearing plates 36*a*, 36*b* and bar 70 define a downwardly facing opening of the load bearing structure 36. During an operation to mount the load wheel assembly 28 to the load bearing structure 36, the load wheel assembly 28 and side members 42*a*, 42*b* are moved relative to one another to position the side members 42*a*, 42*b* into the cutout areas 85. In addition, the upper surface 82 of the block member 64 moves into engagement with the lower surface 86 of the bar 70, see FIG. 3.

The pins 80 slide into openings of the lower hole portions 84*a* at the lower surface 86 of the bar 70 and include tapered ends to facilitate alignment of the block member 64 to the bar 70 so that the aperture 76 in the block member 64 is aligned to the aperture 72 in the bar 70. The fastener 74 may then be inserted through the aperture 72 and threadably engaged in the aperture 76 to retain the block member 64 in engagement with the bar 70. The pins 80 provide structure that, in combination with the fastener 74, substantially prevent relative shearing movement between the block member 64 and the bar 70, and further resist side-to-side movement of the assembled wheel unit 60 relative to the load bearing assembly 36.

Figure 3B:
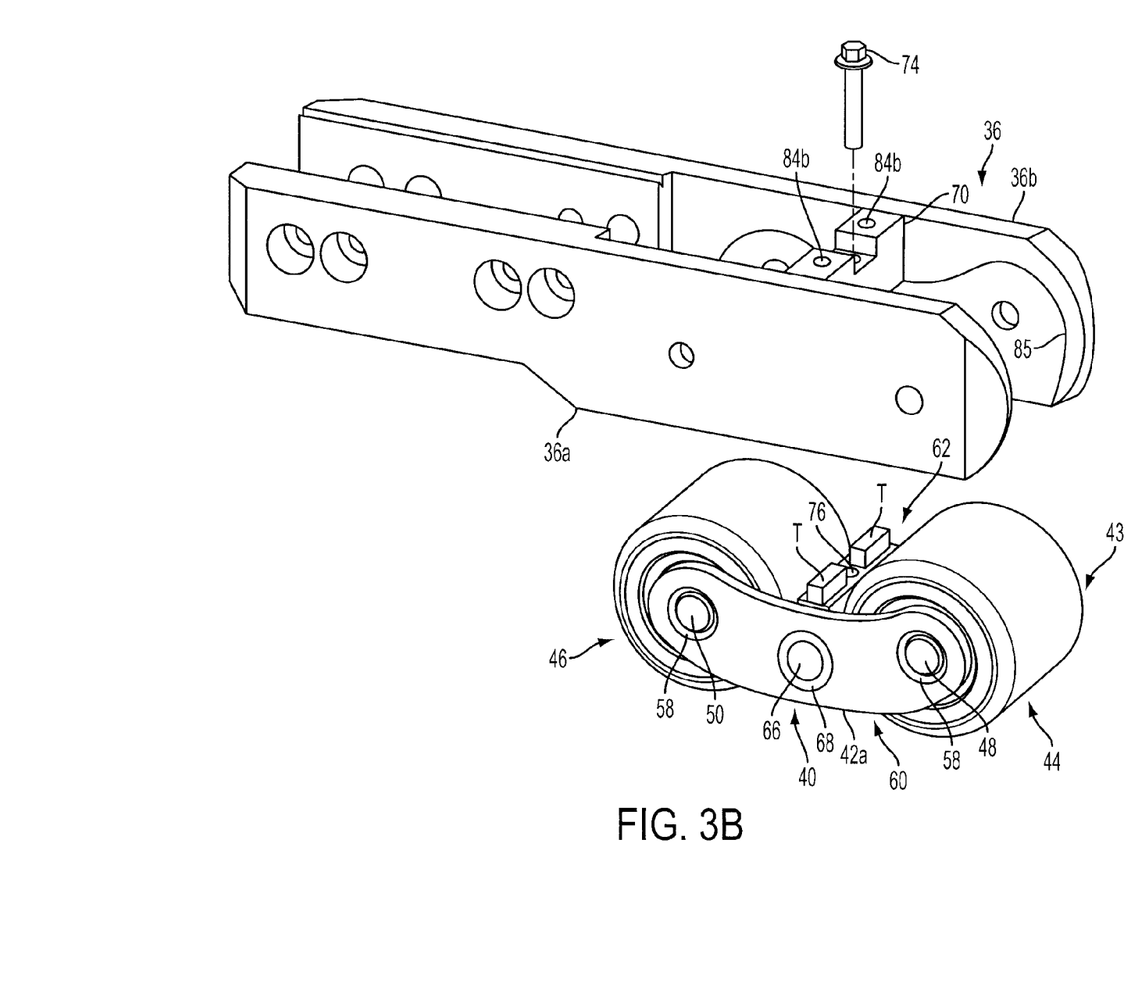

Other arrangements for substantially preventing relative shearing movement between the block member 64 and the bar 70 will be apparent to those skilled in the art. For example, a tenon T and mortis (not shown) joint is illustrated in FIG. 3*b*. FIG. 3*b* also illustrates individual bearing plates 36*a*, 36*b* which can be bolted to the arm member 34.

As noted above, alternative configurations for attaching the block member 64 to the bar 70 include, for example, inserting the fastener 74 upwardly through the block member 64 and threadably engaged it with the bar 70 and a stud and roll pin. Other attachment arrangements will be apparent to those skilled in the art in view of this description.

Figure 6:
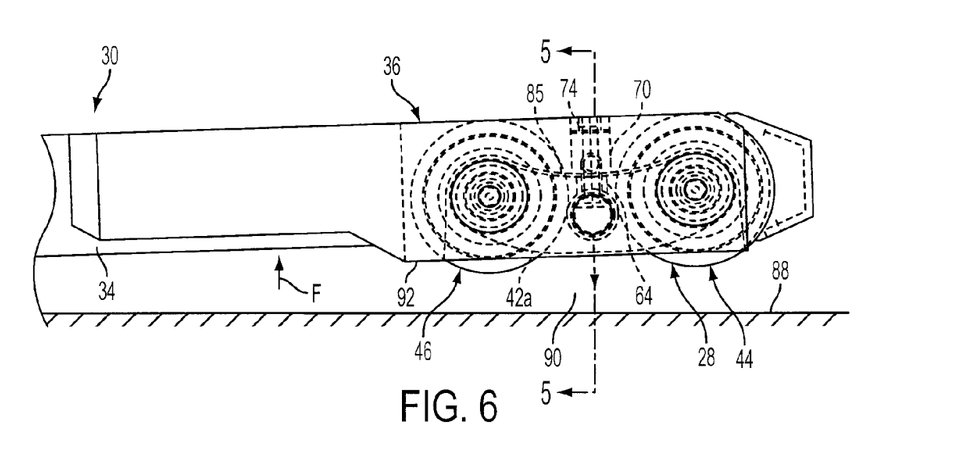
FIG. 6 is a side elevational view of an end portion of the straddle arm illustrating a position for replacement of the load wheel assembly.

Reference to FIG. 6 will now be made to describe an operation for replacing a load wheel assembly 28. The end of the straddle arm 30 may be initially lifted from the floor surface 88, such as by application of a lifting force F to a portion of the straddle arm 30, to create an access space 90 between the floor surface 88 and the lower edge 92 of the load bearing structure 36. The fastener 74 may be removed to permit the block member 64 to separate from the bar 70 and to permit the load wheel assembly 28 to be lowered downwardly as an assembled unit from the load bearing structure 36. A punch and hammer can be used in holes 84*b* to assist removal. A replacement load wheel assembly 28 may then be inserted by moving it into the access space 90 and positioning it upwardly into engagement with the load bearing structure 36, as described above.

Alternately, the fastener 74 can be first removed and the straddle arm 30 lifted so that the straddle arm is lifted off of the wheel assembly 28. The replacement load wheel assembly 26 is then positioned in the access space 90 and the end of the straddle arm 30 may be lowered to bring the bar 70 of the load bearing structure 36 into engagement with the block member 64 of the load wheel assembly 28.

In either event, at least one fastener extending between the straddle arm or outrigger and load wheel assembly is disengaged and an original wheel assembly is moved out of engagement with the outrigger. A replacement wheel assembly is moved into engagement with the outrigger and the at least one fastener is engaged between the replacement wheel assembly and the outrigger to maintain the wheel assembly in engagement with the outrigger.

Figure 7:
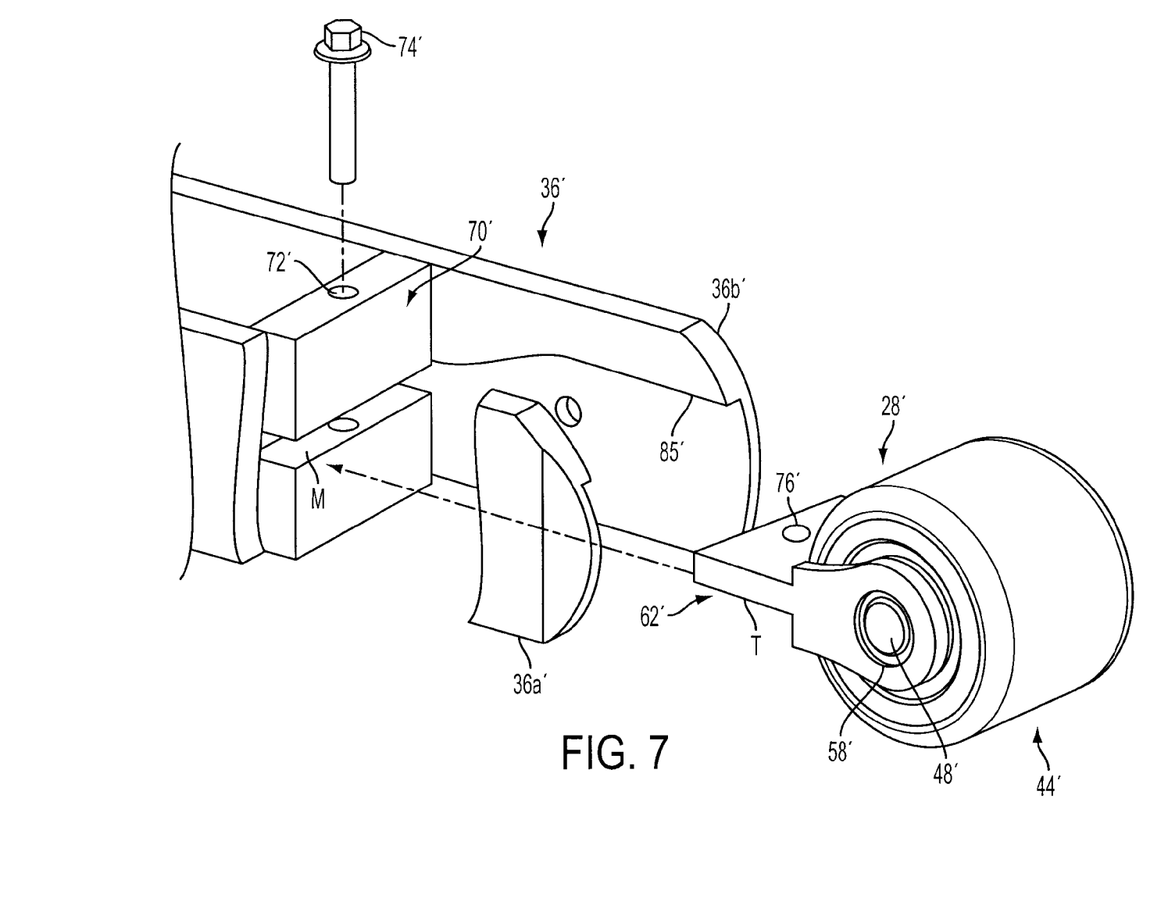
FIG. 7 is a perspective view of a load wheel assembly incorporating the present invention and having a single wheel inserted horizontally into a load bearing structure.

While the illustrated embodiments to this time have relied on vertical movement between a wheel assembly and the load bearing structure, it should be apparent that horizontal movement may also be used to remove and replace a load wheel assembly. Such horizontal movement would require less elevation of the load bearing structure and the movement between the load wheel assembly and the load bearing structure could be sideways or from the front of the load bearing structure. For example, a load wheel assembly 28' having a single wheel 44' is shown in FIG. 7 as being inserted into the load bearing structure 36' with the load wheel assembly 28' having a tenon T that mates with a mortis M on the load bearing structure 36'. The components in FIG. 7 that correspond to similar elements in the previously described embodiments are labeled with the same reference numerals primed.

It can be seen from the above description that the structure for the load wheel assembly 28 provides an efficient load wheel replacement operation in that an uncomplicated interface structure 62 is provided comprising, for example, the single fastener 74 engaged with the block member 64 for attachment and removal of the load wheel assembly 28, requiring minimal manipulation of parts during a replacement or repair operation. Further, the pins 80 or tenon T of the interface structure 62 readily engage with the holes 84 or mortis M of the bar 70 to facilitate positioning of the load wheel assembly 28 relative to the load bearing structure 36, while also strengthening the connection between the two components.

Figure 8:
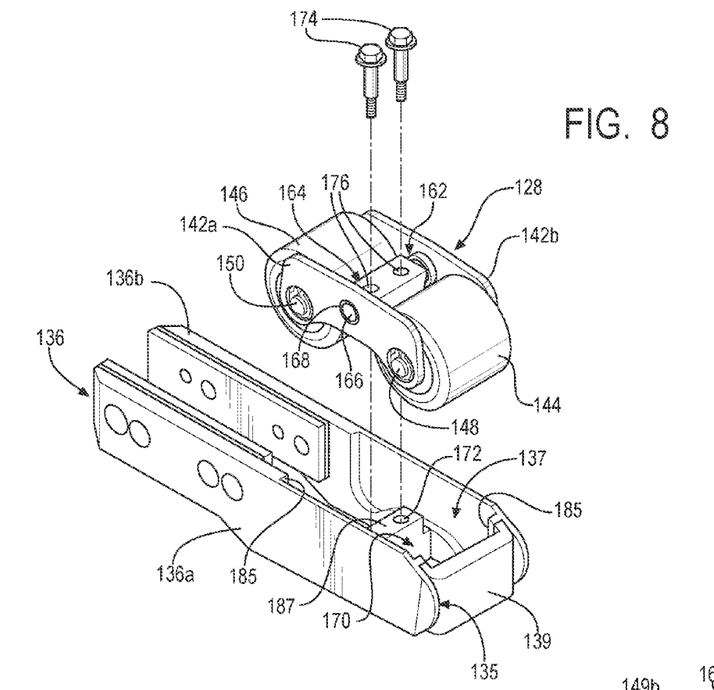
FIG. 8 is a perspective view of the end of a straddle arm of the forklift truck with a further embodiment of a load wheel assembly shown disassembled from the straddle arm.
Figure 9:
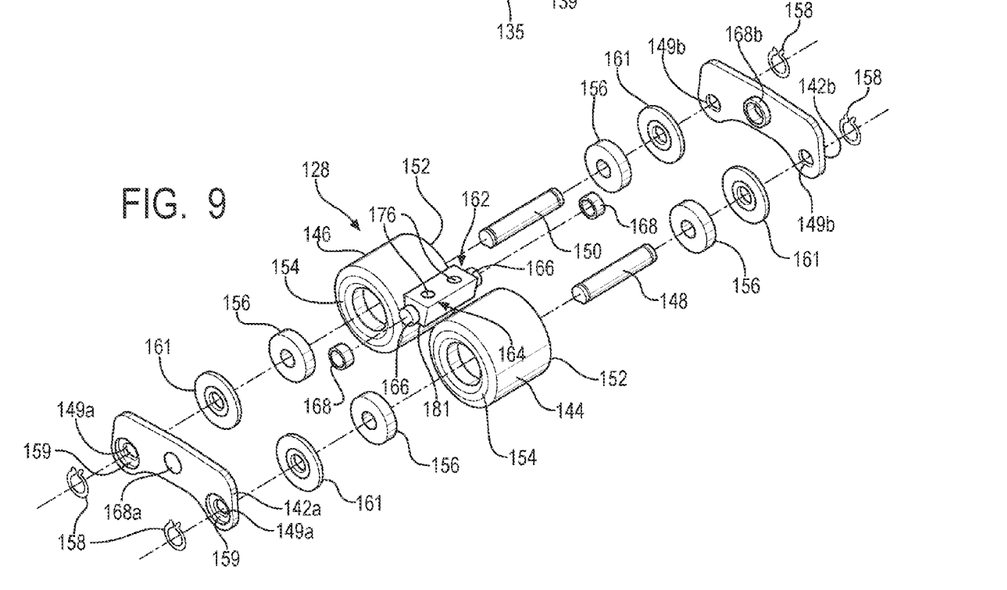
FIG. 9 is an exploded view of the load wheel assembly of FIG. 8.

Referring to FIGS. 8 and 9, an alternative embodiment for an outrigger assembly including a quick change load wheel assembly is illustrated that may be incorporated into an outrigger or straddle arm 30 of a materials handling vehicle, such as a forklift truck 10, as illustrated in FIG. 1. Elements of the outrigger assembly of FIGS. 8 and 9 corresponding to elements of the previously described embodiments are labeled with the same reference numeral increased by 100.

As seen in FIG. 8, a load bearing structure 136 of the present embodiment defines an outrigger box 135 including a pair of bearing plates 136a, 136b laterally spaced from each other and extending in a longitudinal direction of the straddle arm 30 (FIG. 1). The bearing plates 136a, 136b define a load wheel opening 137 therebetween. A transverse bar 170 extends through a longitudinal mid-portion of the load wheel opening 137 and includes opposing ends rigidly attached to the bearing plates 136a, 136b. The transverse bar 170 may be welded to the bearing plates 136a, 136b to form the outrigger box 135 as a rigid weldment. In addition, an outrigger tip 139 may be attached to the load bearing structure 136, such as by bolts (not shown) attaching the outrigger tip 139 to the bearing plates 136a, 136b, to enclose an outer end of the load wheel opening 137.

Referring further to FIG. 9, the outrigger assembly includes a load wheel assembly 128 including side support members comprising a first side member 142a and a second side member 142b located in laterally spaced relation to the first side member 142a. First and second rollers or wheels 144, 146 are supported for rotation on respective first and second axles 148, 150. The first and second axles 148, 150 extend transversely between the side members 142a, 142b with the ends of the axles 148, 150 being received within openings 149a, 149b in the respective side members 142a, 142b. The wheels 144, 146 may comprise known load wheels including a tire 152 supported on a hub portion 154 which includes a bearing 156 for engaging with a respective axle 148, 150. In addition, a bearing shield or spacer 161 may be provided adjacent an outer end of each of the bearings 156 to space the bearings 156 from a respective side member 142a, 142b.

The axles 148, 150 are maintained in engagement in the openings 149a, 149b by a retainer, such as a snap ring 158, i.e., a circlip, engaged in an annular slot or groove in each end of the axles 148, 150. The openings 149a, 149b are preferably formed with a D-shaped cross-section for receiving similarly shape ends of the axles 148, 150. A recess 159 is provided in an outer end of each of the openings 149a, 149b for receiving the snap ring 158 substantially flush within the side of the respective side members 142a, 142b.

The load wheel assembly 128 further includes an interface structure 162 for providing a substantially rigid connection between the load bearing structure 136 and the load wheel assembly 128. In the illustrated embodiment, the interface structure 162 comprises a block member 164, and includes pivot pin ends 166 extending from opposing lateral sides of the block member 164. The pivot pin ends 166 may be integrally formed with the block member 164. For example, the block member 164 may be a machined part with the pin ends 166 formed at the opposing ends thereof. Alternatively, the pivot pin ends 166 may comprise the ends of a pivot pin (not shown) extending through or attached to the block member 164. The pivot pin ends 166 engage in pivot apertures 168a, 168b formed in the respective side members 142a, 142b, generally centrally of the side members 142a, 142b, i.e., between the first and second wheels 144, 146, as illustrated in FIGS. 8 and 9. Further, the pivot pin ends 166 are engaged with bearing members 168 located within the pivot apertures 168a, 168b. The pivot pin ends 166 engaged in the bearing members 168 form a pivot structure about which the load wheel assembly 128 may pivot relative to the load bearing structure 136.

The block member 164 of the interface structure 162 is adapted to engage the transverse bar 170 of the load bearing structure 136. In particular, a lower surface 181 (FIG. 9) of the block member 164 may be located in engagement with an upper surface 187 (FIG. 8) of the transverse bar 170. The block member 164 includes a pair of laterally spaced through apertures 176 for receiving a pair of shoulder bolts 174 therethrough, and the transverse bar 170 includes a pair of threaded apertures 172 (only one shown in FIG. 8) for receiving a threaded end of the bolts 174, as will be described further below. The shoulder bolts 174 are preferably of sufficient strength to transfer load forces from the load bearing structure 136, at the end of the straddle arm 30, to the load wheel assembly 128. For example, the shoulder bolts 174 may comprise a steel metric bolt M12 ×1.75 having a thread length of about 18 mm and a shoulder length of about 50 mm. Further, the bolts 174 preferably have a property class designation of 12.9, i.e. a minimum tensile strength of about 1100 MPa, and a minimum shear strength of about 660 MPa.

Figure 10:
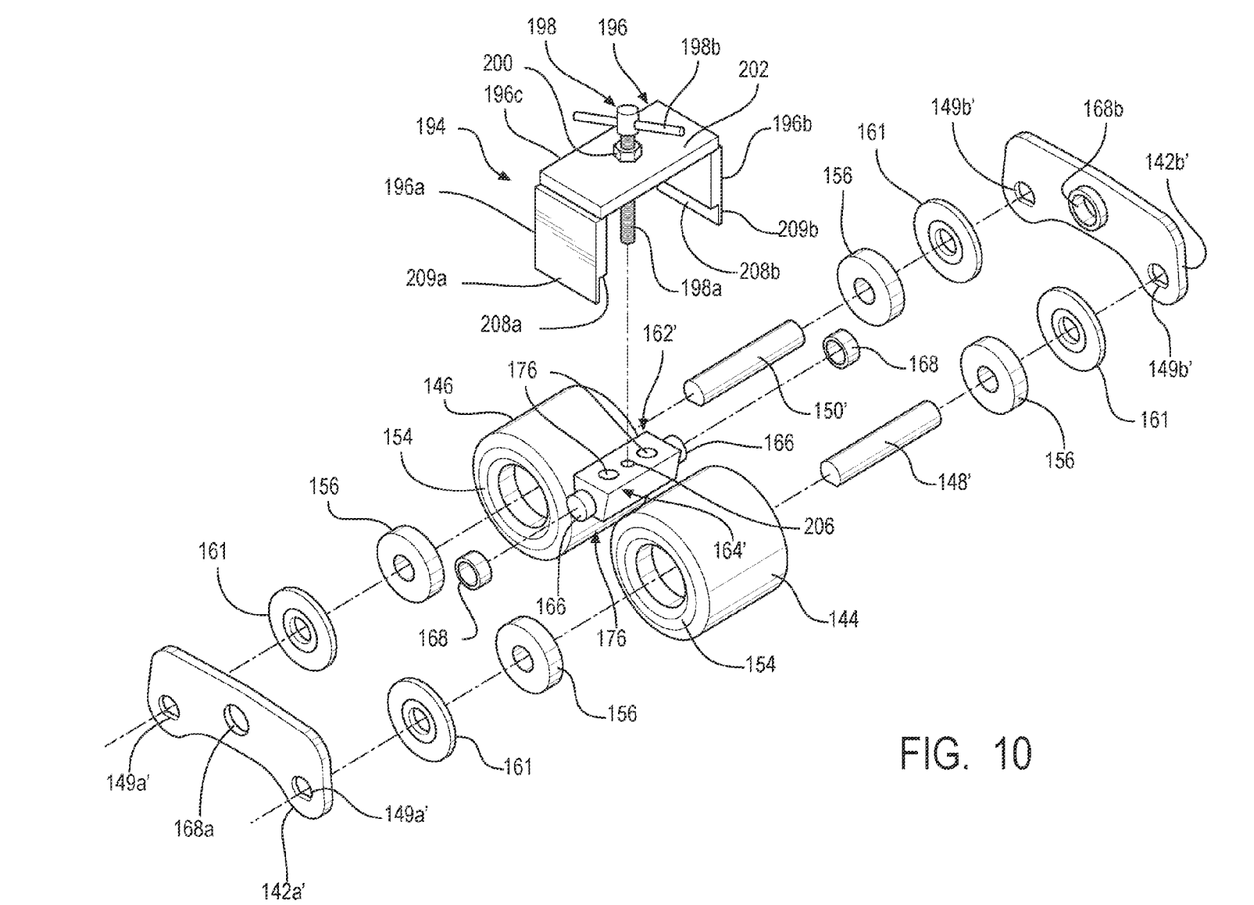
FIG. 10 is an exploded view of an alternative configuration of the load wheel assembly of FIG. 9.

Referring to FIG. 10, the outrigger assembly may comprise a load wheel assembly 128' having an alternative configuration for the axles 148', 150' and the side members 142a', 142b' for enabling the load wheel assembly 128' to support a greater load. In particular, the side members 142a', 142b' may be formed with openings 149a', 149b', respectively, that do not include the recesses 159 illustrated in FIG. 9. That is, the openings 149a', 149b' may be formed as a continuous surface extending between the opposing planar sides of the side members 142a', 142b'. Hence, the openings 149a', 149b' through the side members 142a', 142b' present a greater surface area for engagement with the ends of the axles 148', 150'. Further, the ends of the axles 148', 150' may be formed without a groove or other structure to receive the snap ring 158, and may define a continuous surface for engagement with respective surfaces of the openings 149a', 149b'. The additional load bearing area defined by the contact between the ends of the axles 148', 150' and the surfaces of the holes 149a', 149b' is believed to provide additional load carrying capacity to the side members 142a', 142b' in the area of the ends of the axles 148', 150'. As in the configuration described with reference to FIGS. 8 and 9, the openings 149a', 149b' are preferably formed with a D-shaped cross-section for receiving similarly shaped ends of the axles 148', 150'.

It may be noted that, since the load wheel assembly 128' described with reference to FIG. 10 does not include a retention structure, such as the snap ring 158, to retain the side members 142a', 142b' in engagement with the ends of the axles 148', 150' and with the pin ends 166 of the interface structure 162', a retention tool 194 may be provided to retain the load wheel assembly 128' in an assembled state, i.e., with side members 142a', 142b' in engagement with the axles 148', 150' and with the interface structure 162', when it is not positioned in the load wheel opening 137 (FIG. 8). The retention tool 194 may comprise a C-shaped frame 196 including opposing side member engagement structure comprising side plates 196a, 196b and a base plate 196c extending between and oriented perpendicular to the side plates 196a, 196b. The side plates 196a, 196b may be formed integrally with the base plate 196c, such as by being formed from a single plate or cast as a unitary member, or may comprise a weldment. Further, it should be understood that the retention tool 194 may comprise other configurations than the particular C-shaped structure described herein, to the extent that an alternative configuration may perform the function of the retention tool 194 for installing and/or removing the load wheel assembly 128' to and from the outrigger box 137, as described below.

Figure 11:
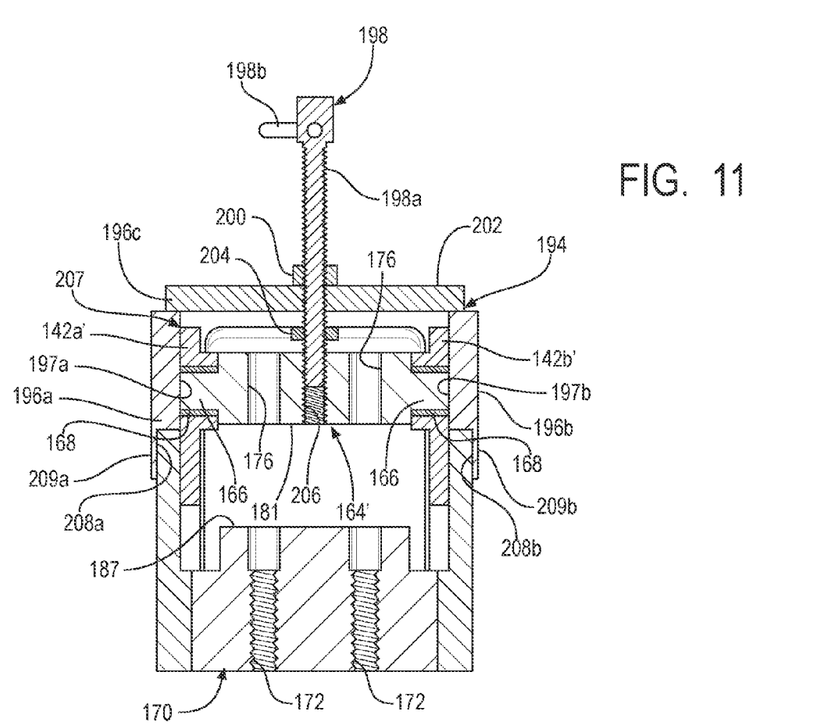
FIG. 11 is a cross-sectional view illustrating the load wheel assembly of FIG. 10 located in a retention tool.

Referring further to FIG. 11, the retention tool 194 includes a threaded screw member 198 having a threaded shank 198a and a handle 198b. A first threaded nut 200 is threadably engaged on the shank 198a and is locate between the handle 198b and an upper surface 202 of the base plate 196c. A second threaded nut 204 is threadably engaged on the shank 198a on a side of the base plate 196c opposite from the first nut 200. The retention tool 144 may be engaged with the load wheel assembly 128' by at least partially threading the threaded shank 198a into a threaded aperture 206 in the block member 164'. The first nut 200 may be rotated on the threaded shank 198a to move the first nut 200 toward the block member 164' to a location on the threaded shank 198a where the assembled load wheel assembly 128' is positioned with at least an upper portion of the side members 142a', 142b' located in engagement with respective inner surfaces 197a, 197b of the side plates 196a, 196b, as seen in FIG. 11. The lower nut 204 may be located at a predetermined fixed position to define a stop position for upward movement of the screw member 198 through the base plate 198c. Further, the second nut 204 may prevent the screw member 198 from becoming separated from the base plate 196c when not engaged with the load wheel assembly 128'.

The load wheel assembly 128' retained within the retention tool 194 comprises a load wheel preassembly 207 (FIG. 11) for installation in the outrigger box 135. As seen in FIG. 11, the load wheel preassembly 207 is located with the side plates 196a, 196b engaged on upper portions of the bearing plates 136a, 136b. The side plates 196a, 196b include respective recessed areas 208a, 208b for receiving the upper portions of the bearing plates 136a, 136b, with a tab portion 209a, 209b of the side plates 196a, 196b extending along an outer portion of the bearing plates 136a, 136b, to align the retention tool 194 in a lateral direction relative to the outrigger box 135. Further, the inner surfaces 197a, 197b of the retention tool side plates 196a, 196b are substantially aligned with inner surfaces of the bearing plates 136a, 136b in cutout or recess areas 185 defined in the bearing plates 136a, 136b for receiving a respective one of the side members 142a', 142b' and for accommodating pivoting movement of the side members 142a', 142b'.

Figure 12:
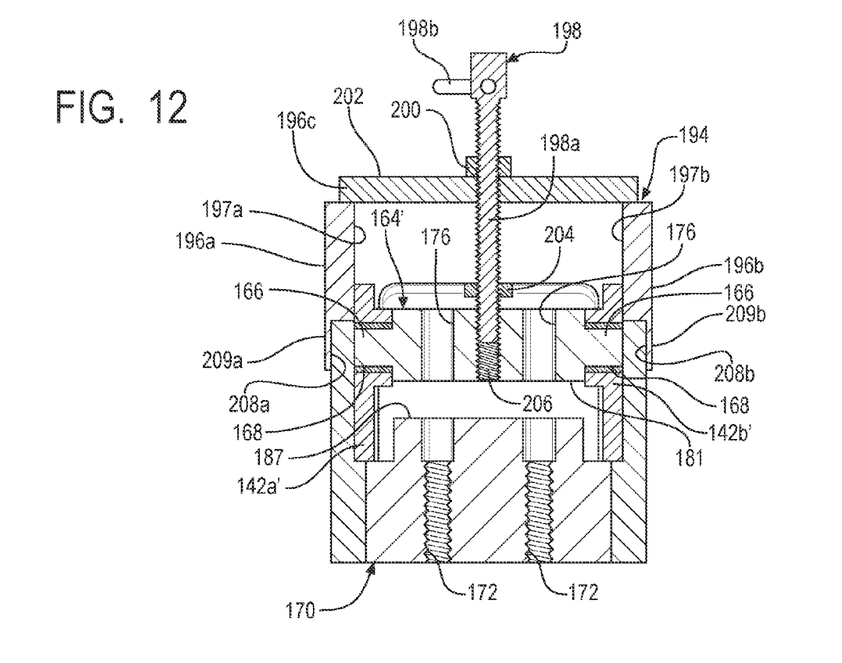
FIG. 12 is a cross-sectional view illustrating the load wheel assembly of FIG. 10 in a transferred position from the retention tool to a load wheel opening in an outrigger box.

As seen in FIG. 12, the load wheel assembly 128' may be lowered from the retention tool 194 into the load wheel opening 137 by rotating the first nut 200 to permit the load wheel assembly 128' to move downwardly away from the base plate 196c, to engage the wheels 144, 146 in contact with a support surface, such as a floor surface, wherein the wheels 144, 146 may be located on either side of the transverse bar 170. The screw member 198 may then be rotated to disengage the threaded shank 198a from the threaded aperture 206 in the block member 164, and the retention tool 194 may be removed from the outrigger box 135. Subsequent to lowering the load wheel assembly 128' into the load wheel opening 137, the lower surface 181 of the block member 164' is located in spaced relation above the upper surface 187 of the transverse bar 170. Further, the bearing plates 136a, 136b may rest on the support surface prior to engagement of the block member 164' with the transverse bar 170.

Figure 13:
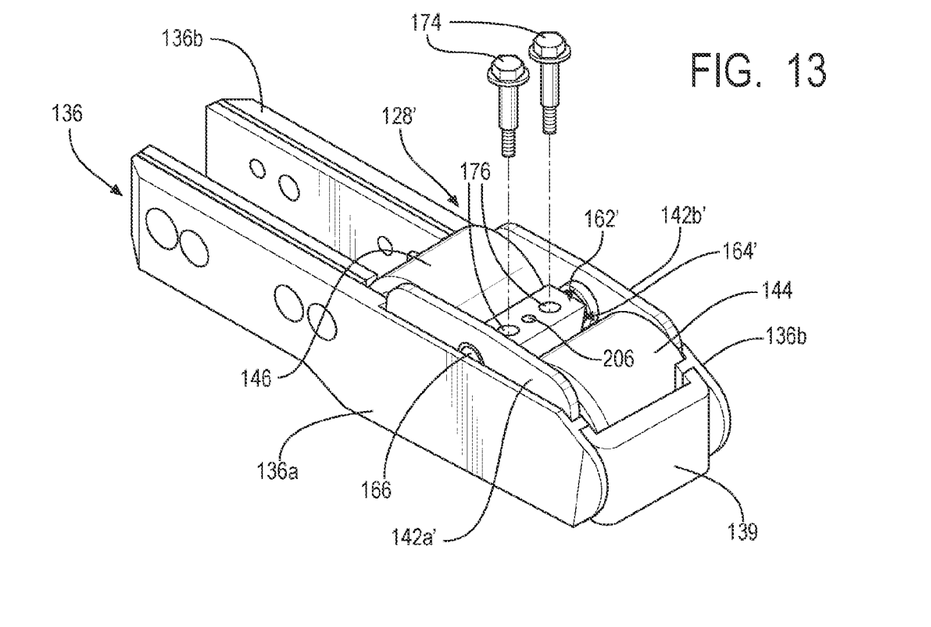
FIG. 13 is a perspective view of the load wheel assembly of FIG. 10 positioned in the load wheel opening of the outrigger box prior to engagement of an interface structure of the load wheel assembly with a mounting structure of the straddle arm.
Figure 14:
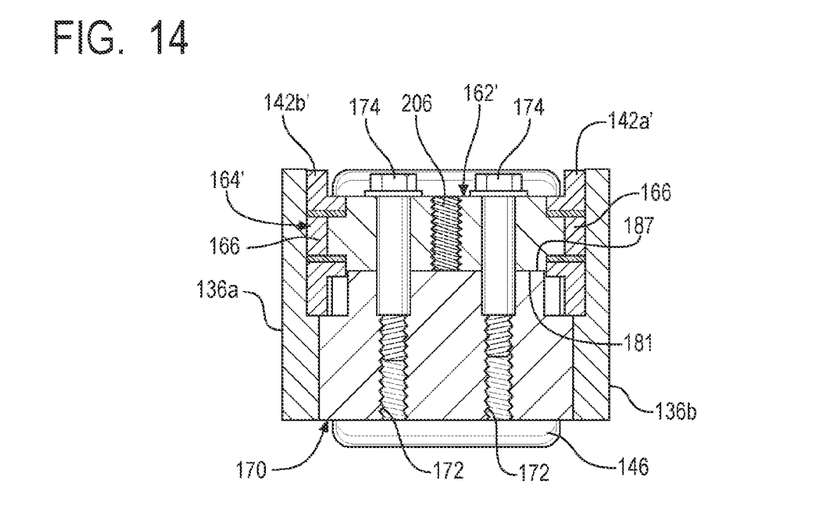
FIG. 14 is a cross-sectional view of the load assembly of FIG. 10 engaged with the mounting structure of the straddle arm.

During an assembly operation for engaging the block member 164' with the transverse bar 170, the bolts 174 may be inserted through the block member apertures 176 and into threaded engagement in the transverse bar apertures 172, see FIG. 13. Further, the bolts 174 may be rotated to draw the transverse bar 170 toward the block member 164', thereby lifting the load bearing structure 136 from the support surface. For example, the bolts 174 may be alternately rotated to alternately move the transverse bar 170 a portion of the distance upwardly toward the block member 164' until the upper surface 187 of the transverse bar 170 engages and mates with the lower surface 181 of the block member 164', forming a substantially rigid connection between the interface structure 162' and the transverse bar 170, as seen in FIG. 14.

It should be understood that the load wheel assembly 128 described with reference to FIGS. 8 and 9 may be installed on the load bearing structure 136 by a substantially similar operation, with the exception that the load wheel assembly may be positioned in the load wheel opening without the use of the retention tool 194. Hence, the load wheel assemblies 128, 128' may be installed on the load bearing structure 136 without the use of a jack or other implement to support the ends of the bearing plates 136a, 136b in spaced relation to the support surface as the load wheel assembly 128, 128' is located in its installed position relative to the load bearing structure 136.

Further, the load wheel assembly 128, 128' may be removed by loosening the bolts 174, resulting in the bearing plates 136a, 136b lowering into resting engagement on the support surface. In the case of the load wheel assembly 128', the retention tool 194 may be positioned over the load wheel assembly 128' after removal of the bolts 174. The screw member 198 may be engaged with the threaded hole 206 in the block member 164 (FIG. 12), and the first nut 200 may be rotated to move the load wheel assembly 128' upwardly to the position illustrated in FIG. 11 for removal of the load wheel assembly 128' from the load wheel opening 137.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An outrigger assembly for a materials handling vehicle comprising:
   a frame supporting a straddle arm;
   an outrigger box coupled to said straddle arm and comprising:
      a pair of bearing plates laterally spaced from each other and defining a load wheel opening therebetween; and a transverse bar spanning across said load wheel opening between said bearing plates;
a load wheel assembly comprising:
first and second side support members spaced laterally from one another;
at least one roller mounted for rotation between said first and second side support members to define at least one load wheel;
an axle supporting said at least one roller to said first and second side support members; and
an interface structure spanning between and coupled to said first and second side support members;
said interface structure having at least a portion that engages and mates with said transverse bar to provide a substantially rigid connection between said interface structure and said transverse bar and thereby to said materials handling vehicle.

2. The outrigger assembly of claim 1, wherein said interface structure is detachably retained in engagement with said transverse bar by a fastener.

3. The outrigger assembly of claim 2, wherein said fastener extends through an aperture formed at least partially through said interface structure and said transverse bar.

4. The outrigger assembly of claim 3, wherein said fastener extends vertically between said interface structure and said transverse bar.

5. The outrigger assembly of claim 4, wherein said interface structure mates with an upper surface of said transverse bar.

6. The outrigger assembly of claim 1, wherein said side support members each comprise an aperture for receiving a respective end of said axle, each said aperture receiving said respective ends of said axle in sliding engagement, and said side support members being positioned in engagement with an inner surface of one of said bearing plates for retaining said side support members in engagement with said ends of said axle.

7. The outrigger assembly of claim 6, wherein said inner surfaces of said bearing plates comprise recessed areas for receiving said side support members therein.

8. The outrigger assembly of claim 1, wherein said interface structure comprises a block member extending transversely between said side support members.

9. The outrigger assembly of claim 8, including a pivot aperture formed in each of said side support members, and including pivot pin ends extending from opposing sides of said block member and engaged within said pivot apertures.

10. The outrigger assembly of claim 9, including a pair of rollers supported on respective axles extending between said side support members, wherein said rollers are supported on opposite sides of said pivot pin ends with reference to a longitudinal direction of said straddle arm.

11. A materials handling vehicle having a quick change load wheel assembly and comprising:
a frame;
a mast assembly coupled to said frame;
a pair of straddle arms coupled to said frame and extending from a front of said vehicle, each of said straddle arms including:
mounting structure comprising a pair of laterally spaced bearing plates defining a load wheel opening for receiving a quick change load wheel assembly; and
a transverse bar extending laterally across said load wheel opening;
said load wheel assembly comprising:
first and second side support members spaced laterally from one another;
a pair of rollers mounted for rotation between said first and second side support members to define a pair of load wheels;
an axle supporting each of said rollers to said first and second side support members; and
a block member spanning between and coupled to said first and second side support members, said side support members supported for pivotal movement relative to said block member;
said block member having at least a portion that engages and mates with said transverse bar to provide a substantially rigid connection between said block member and said transverse bar and thereby to said materials handling vehicle.

12. The materials handling vehicle of claim 11, including a fastener extending between said block member and said transverse bar for retaining said interface structure in engagement with said transverse bar.

13. The materials handling vehicle of claim 11, including a pivot aperture formed in each of said side support members, and including pivot pin ends extending from opposing sides of said block member and engaged within said pivot apertures.

* * * * *